(12) United States Patent
Cho et al.

(10) Patent No.: US 8,298,319 B2
(45) Date of Patent: Oct. 30, 2012

(54) PRESSURE SWING ADSORPTION APPARATUS AND METHOD FOR HYDROGEN PURIFICATION USING THE SAME

(75) Inventors: Soon Haeng Cho, Daejeon (KR); Sodankoor Garadi Thirumaleshwara Bhat, Daejeon (KR); Sang Sup Han, Daejeon (KR); Jong Ho Park, Daejeon (KR); Jong Nam Kim, Daejeon (KR); Heon Jung, Daejeon (KR)

(73) Assignee: Korean Institute of Energy Research, Daejeon (KR)

( * ) Notice: Subject to any disclaimer, the term of this patent is extended or adjusted under 35 U.S.C. 154(b) by 289 days.

(21) Appl. No.: 12/668,068

(22) PCT Filed: Jul. 13, 2007

(86) PCT No.: PCT/KR2007/003405
§ 371 (c)(1),
(2), (4) Date: Sep. 22, 2010

(87) PCT Pub. No.: WO2009/008565
PCT Pub. Date: Jan. 15, 2009

(65) Prior Publication Data
US 2011/0005391 A1    Jan. 13, 2011

(30) Foreign Application Priority Data
Jul. 9, 2007    (KR) ........................ 10-2007-0068600

(51) Int. Cl.
*C01B 3/02*    (2006.01)
*B01D 53/047*    (2006.01)
(52) U.S. Cl. .................. 95/96; 95/139; 95/140; 95/143; 96/132; 96/153
(58) Field of Classification Search .............. 95/96, 117, 95/139, 140, 143, 900; 96/121, 132, 153; 502/415; 423/247
See application file for complete search history.

(56) References Cited

U.S. PATENT DOCUMENTS
3,430,418 A    3/1969    Wagner
(Continued)

FOREIGN PATENT DOCUMENTS
JP    11009934 A    1/1999
(Continued)

OTHER PUBLICATIONS
International Search Report for PCT/KR2007/003405.

*Primary Examiner* — Frank Lawrence, Jr.
(74) *Attorney, Agent, or Firm* — LRK Patent Law Firm (57) ABSTRACT

Disclosed are a pressure swing adsorption apparatus for hydrogen purification and a hydrogen purification method using the same. The pressure swing adsorption apparatus for hydrogen purification includes a plurality of adsorption columns connected with a feed supply pipe, a hydrogen storage tank for collecting purified hydrogen from the adsorption columns, and valves for opening or closing a plurality of pipes connected to the respective adsorption columns, and the adsorption columns are packed with adsorbent beds of active alumina or silica gel, activated carbon, zeolite 13X, zeolite 5A, and a carbon monoxide-selective adsorbent other than the zeolite 5A, in order to remove carbon dioxide, methane, and carbon monoxide from a hydrogen-containing gas mixture supplied through the feed supply pipe, and the content of carbon monoxide in the discharged hydrogen is minimized through sequential adsorption on the adsorbents in the adsorption columns. The content of carbon monoxide in the purified hydrogen product can be decreased to 10 ppm or less, thus facilitating the production of highly pure hydrogen products.

19 Claims, 5 Drawing Sheets

U.S. PATENT DOCUMENTS

| | | | |
|---|---|---|---|
| 4,917,711 A | 4/1990 | Xie et al. | |
| 5,300,271 A | 4/1994 | Golden et al. | |
| 5,531,809 A * | 7/1996 | Golden et al. | 95/101 |
| 6,340,382 B1 | 1/2002 | Baksh et al. | |
| 6,402,813 B2 * | 6/2002 | Monereau et al. | 95/96 |
| 6,464,756 B1 | 10/2002 | Plee | |
| 6,514,317 B2 * | 2/2003 | Hirano et al. | 95/96 |
| 6,572,681 B1 * | 6/2003 | Golden et al. | 95/122 |
| 2003/0126989 A1 | 7/2003 | Bancon et al. | |
| 2003/0172808 A1 | 9/2003 | Le Bec | |
| 2005/0257685 A1 | 11/2005 | Baksh et al. | |
| 2006/0236862 A1 | 10/2006 | Golden et al. | |
| 2006/0254425 A1 | 11/2006 | Baksh et al. | |
| 2008/0105122 A1 * | 5/2008 | Leitgeb et al. | 95/116 |

FOREIGN PATENT DOCUMENTS

| | | |
|---|---|---|
| JP | 13300244 A | 10/2001 |
| KR | 1020000051347 A | 8/2000 |
| KR | 1020010076171 A | 8/2001 |
| KR | 1020080106632 A | 12/2008 |

\* cited by examiner

| time \ adsorption column | t1 | t2 | t3 | t4 | t2 | t3 | t4 | t2 | t5 |
|---|---|---|---|---|---|---|---|---|---|
| 1st adsorption column | adsorption | adsorption | adsorption | adsorption | primary pressure equalization | supply of purge gas | secondary pressure equalization | primary pressure equalization | product pressurization |
| 2nd adsorption column | countercurrent depressurization | purging | product pressurization | product pressurization | adsorption | adsorption | adsorption | primary pressure equalization | supply of purge gas |
| 3rd adsorption column | primary pressure equalization | primary pressure equalization | adsorption | adsorption | primary pressure equalization | supply of purge gas | secondary pressure equalization | countercurrent depressurization | purging |
| 4th adsorption column | primary pressure equalization | supply of purge gas | secondary pressure equalization | countercurrent depressurization | primary pressure equalization | product pressurization | product pressurization | adsorption | adsorption |

| time \ adsorption column | t1 | | | | t2 | t3 | t4 | t2 | t3 | t4 |
|---|---|---|---|---|---|---|---|---|---|---|
| 1st adsorption column | adsorption | | | product pressurization | supply of purge gas | pressure equalization | countercurrent depressurization | purging | pressure equalization | product pressurization |
| 2nd adsorption column | purging | pressure equalization | countercurrent depressurization | | adsorption | | | supply of purge gas | pressure equalization | countercurrent depressurization |
| 3nd adsorption column | supply of purge gas | pressure equalization | product pressurization | | purging | pressure equalization | product pressurization | adsorption | | |

Fig. 5

PRESSURE SWING ADSORPTION APPARATUS AND METHOD FOR HYDROGEN PURIFICATION USING THE SAME

TECHNICAL FIELD

The present invention relates to a pressure swing adsorption (PSA) apparatus for hydrogen purification and a hydrogen purification method using the same, and, more particularly, to a PSA apparatus and a hydrogen purification method using the same, in which the adsorptive selectivity of impurities, including carbon dioxide ($CO_2$), methane ($CH_4$), and carbon monoxide (CO), in a gas mixture containing hydrogen gas, is increased using a 3- or 4-column PSA apparatus, so that the contents of carbon monoxide (CO) and carbon dioxide ($CO_2$) are decreased to a very low level, thus producing highly pure hydrogen products.

BACKGROUND ART

In industrial sites, hydrogen production is conducted in a manner such that natural gas, naphtha, and other hydrocarbon sources are subjected to steam reforming or such that hydrogen is recovered from various gas mixtures of petrochemical industries. Conventionally, hydrogen purification is mainly realized through a PSA process using discharge gas from a steam methane reformer.

In a typical PSA process, components of a gas mixture are separated using differences in adsorptive selectivity of adsorbates to an adsorbent. The adsorption procedure for separating a less strongly adsorbable component from a more strongly adsorbable component is chiefly conducted at high pressure, and the pressure of the adsorption column is decreased so that the adsorbed component is desorbed, thus regenerating the adsorbent.

In order to sufficiently regenerate the adsorbent, a purging step is conducted at low pressure using a less strongly adsorbable component having high purity and, for pressurization to adsorption pressure, a feed gas or a hydrogen product is used.

The PSA method for hydrogen purification is conducted through a process composed principally of an adsorption step, a countercurrent depressurization step, a purging step, and a pressurization step. However, when only this process is applied, the recovery of mechanical energy to the adsorption unit is also decreased, as well as the recovery of a hydrogen product.

The adsorption step is conducted until the purity of a hydrogen product is maintained as desired under high pressure. After the completion of the adsorption step, the pores of the adsorption column are packed with a less strongly adsorbable component having a concentration not lower than that of feed gas. So, a countercurrent depressurization step is conducted immediately after the completion of the adsorption step at high pressure, thus regenerating the adsorbent.

However, in the course of regeneration of the adsorbent, the less strongly adsorbable component, for example, hydrogen or the like, is lost, undesirably decreasing the recovery of the less strongly adsorbable component. Therefore, with the goal of increasing the recovery of the less strongly adsorbable component, a cocurrent depressurization step or a pressure equalization step is introduced.

The gas, which is discharged in the cocurrent depressurization step or the pressure equalization step, is used to pressurize another adsorption column during a pressurization step and to purge a further adsorption column during a purging step, thereby maintaining mechanical energy in the adsorption unit and contributing to an increase in the recovery and purity of hydrogen products.

Generally, a gas mixture, which is a feed gas to be supplied to a hydrogen purification process, includes impurities such as carbon dioxide, nitrogen, methane, water, and carbon monoxide. Among these impurities, carbon monoxide is problematic in that it is very difficult to remove.

The prior patents disclosing the PSA method for hydrogen purification, as noted above, are briefly described below.

U.S. Pat. No. 3,430,418 discloses a PSA process for purifying hydrogen from a hydrogen-containing gas mixture including impurities such as carbon monoxide (CO), carbon dioxide ($CO_2$), methane ($CH_4$), nitrogen ($N_2$), and water ($H_2O$) using two adsorbents. In this disclosure, the activated carbon adsorbent is used to remove methane ($CH_4$), carbon dioxide ($CO_2$), and water ($H_2O$), and calcium (Ca) ion-exchanged zeolite 5A is used to remove nitrogen ($N_2$) and carbon monoxide (CO).

U.S. Pat. No. 4,917,711 discloses the preparation of an adsorbent for selectively adsorbing carbon monoxide using a solid mixture comprising a support selected from among zeolite, alumina, silica gel, aluminosilicate, aluminophosphate and combinations thereof, and a cuprous compound, or further comprising a solvent. In this disclosure, using a solvent selected from among water, an aqueous solution containing hydrochloric acid, primary or secondary alcohols having 1~7 carbon atoms, acetone, ethylacetate, hydrocarbons having 4~7 carbon atoms, propionitrile and acetonitrile, a cupric compound supported on the support is converted into the corresponding cuprous compound.

U.S. Pat. No. 5,300,271 discloses an active composition, such as an adsorbent and a catalyst, comprising a cuprous compound dispersed on amorphous oxide or a macroporous carbon support. Such an active composition is prepared by supporting a cupric compound on a pretreated support with the aid of an aqueous solution of ammonium citrate and then subjecting the cupric compound to activation or reduction to the corresponding cuprous compound. Such a cuprous compound is used to separate carbon monoxide or olefins.

US Patent Application Publication No. 2003-0126989 discloses the purification of a $CO/H_2$ or $N_2/H_2$ gas mixture containing carbon dioxide ($CO_2$), water ($H_2O$), hydrocarbons, and/or NOx before supplying it to a cryogenic process. This disclosure pertains to a temperature swing adsorption method and/or a pressure swing adsorption method using zeolite NaLSX (a ratio of Si/Al is 0.9~1.1) to remove such impurities.

US Patent Application Publication No. 2003-0172808 discloses the appropriate arrangement and use of adsorbents, comprising activated carbon, alumina, or silica gel, to remove water ($H_2O$), carbon dioxide ($CO_2$) and hydrocarbons having 1~8 carbon atoms from a hydrogen-containing gas mixture including impurities such as carbon dioxide ($CO_2$), hydrocarbons having 1~8 carbon atoms, water ($H_2O$), carbon monoxide (CO) and nitrogen ($N_2$), Ca ion-exchanged zeolite 5A to selectively adsorb and remove carbon monoxide (CO), and Ca or Li ion-exchanged zeolite LSX (low silica X zeolite) to remove nitrogen ($N_2$), thereby increasing the productivity of hydrogen and the yield of purified hydrogen.

U.S. Pat. No. 6,340,382 discloses a PSA method for purifying hydrogen from a hydrogen-containing gas mixture including water ($H_2O$), nitrogen ($N_2$), carbon dioxide ($CO_2$), methane ($CH_4$), and carbon monoxide (CO) as impurities. This disclosure pertains to a PSA process using a plurality of adsorption columns which are packed with an alumina bed for removing water ($H_2O$), an activated carbon bed for removing carbon dioxide ($CO_2$), methane ($CH_4$) and carbon monoxide (CO), and an ion-mixed zeolite bed (molar ratio of $SiO_2$/$Al_2O_3$ is 2.0~2.5) containing CaX, LiA, LiX or a Ca cation for adsorbing and removing nitrogen.

U.S. Pat. No. 6,464,756 discloses the purification of hydrogen through a PSA method from a hydrogen-containing gas mixture including carbon monoxide (CO) and/or nitrogen ($N_2$) as impurities. In this disclosure, the adsorbent is exemplified by faujasite zeolite having a molar ratio of Si/Al of 1~3. Particularly useful is faujasite zeolite having a molar ratio of Si/Al of 1~1.5 and an aluminum tetrahedral framework in which the proportion of crystal lattices associated with lithium cations and calcium cations is at least 85%, so that the ratio of lithium/(lithium+calcium) is at least 70%.

US Patent Application Publication No. 2005-0257685 discloses a PSA process for producing a less strongly adsorbable component (e.g., hydrogen), in which one process cycle comprising steps of pressurization, pressure equalization, production of predetermined product gas, countercurrent depressurization, and purging is iterated while continuously supplying a gas mixture to be separated, and a plurality of adsorption columns and specific 12 steps are applied.

US Patent Application Publication No. 2006-0236862 discloses a PSA system composed of a plurality of adsorption columns for hydrogen purification and passing reformer exhaust gases, including hydrogen ($H_2$), carbon monoxide (CO), carbon dioxide ($CO_2$), methane ($CH_4$), and nitrogen ($N_2$), through adsorption columns. The respective adsorption columns have a first adsorbent bed for selectively adsorbing carbon monoxide (CO) and nitrogen ($N_2$), and a second adsorbent bed disposed between the inlet of the adsorption column and the first adsorbent bed to selectively adsorb methane ($CH_4$) and carbon dioxide ($CO_2$). The adsorbent charged in the first bed is characterized in that, for carbon monoxide (CO), a Henry's law constant ranges from about 2.5 to about 5.5 mol/g/atm, and the heat of adsorption is between about 6.0 to about 7.5 kcal/gmole, a Henry's law constant for nitrogen ($N_2$) is greater than about 1.5 mol/g/atm, and the selectivity of carbon monoxide (CO) to nitrogen ($N_2$) is about 5.0~8.0. As the adsorbent material having such performance, an adsorbent composed of a binder and zeolite 5A, which is exchanged with 70~95% Ca, an adsorbent which is binderless and includes zeolite 5A, which is exchanged with 60~91% Ca, and a cuprous chloride (CuCl)-impregnated activated carbon adsorbent are claimed. Further, activated carbon is claimed as the adsorbent of the second bed.

US Patent Application Publication No. 2006-0254425 discloses an optimal set of adsorbents for use in hydrogen purification. Each adsorption column is divided into four regions, in which a first region includes an adsorbent for removing water ($H_2O$), a second region includes a mixture of weak and strong adsorbents to remove bulky impurities such as carbon dioxide ($CO_2$), a third region includes a high-density adsorbent for removing remaining carbon dioxide ($CO_2$), most methane ($CH_4$), and carbon monoxide (CO), and a fourth region includes an adsorbent having a high Henry's law constant to remove nitrogen ($N_2$) and residual impurities. This disclosure pertains to a PSA method for producing a highly pure hydrogen product as desired by passing a feed gas through the adsorption column having four regions.

Finally, Korean Patent Application No. 2007-54275, submitted by the present applicant, discloses a solid adsorbent, obtained by dissolving cuprous salts or mixtures thereof in a predetermined solvent to thus prepare a stabilized cuprous salt solution, which is then brought into contact with a solid support so that the cuprous salt is supported and dispersed on the solid support. This disclosure is advantageous because the selectivity to carbon monoxide can be increased, and further, the content of carbon monoxide in the hydrogen-containing gas mixture can be decreased to a very low level.

In this way, in order to remove impurities from the gas mixture containing hydrogen gas, conventionally, the PSA process using activated carbon and zeolite 5A adsorbents is mainly applied. In particular, zeolite 5A is useful as an adsorbent for selectively reversibly adsorbing carbon monoxide.

More specifically, to date, in the PSA process for hydrogen purification, activated carbon is used to remove carbon dioxide ($CO_2$) and methane ($CH_4$), and Ca ion-exchanged zeolite 5A is used to remove methane ($CH_4$), carbon monoxide (CO), or nitrogen ($N_2$).

However, because the zeolite 5A adsorbent has strong ability to adsorb carbon dioxide and water, when carbon dioxide and water are adsorbed, the ability to adsorb carbon monoxide is decreased, undesirably causing problems in which a hydrogen product resulting from the PSA process using the zeolite 5A adsorbent cannot but contain a considerable amount of carbon monoxide. This problem may be solved in such a way that the adsorption column for PSA is packed with an excess of the zeolite 5A adsorbent, but this solution is disadvantageous.

Further, taking into consideration the efficiency of use of purified hydrogen, in a PEMFC (Proton Exchange Membrane Fuel Cell), hydrogen is a reactant on the anode side, and oxygen is a reactant on the cathode side. The anode and the cathode are formed of fine catalyst particles. Such a catalyst is typically precious metal. A membrane electrode assembly is somewhat expensive to manufacture and requires specific conditions for efficient operation. For example, because carbon monoxide (CO), present in the reactants, poisons the platinum catalyst used for the anode and cathode, in order to decrease the load of the catalyst, the content of carbon monoxide in the hydrogen fuel used for the anode should be 10 ppmv or less, and preferably 3 ppmv or less.

DISCLOSURE OF INVENTION

Technical Problem

Accordingly, the present invention has been made keeping in mind the above disadvantages and problems encountered in the related art with regard to the conventional PSA process, and an object of the present invention is to provide a hydrogen purification method, in which the adsorptive selectivity to impurities, including carbon dioxide ($CO_2$), methane ($CH_4$), and carbon monoxide (CO), in a gas mixture containing hydrogen gas, is increased using a 3- or 4-column PSA apparatus, so that the contents of carbon monoxide (CO) and carbon dioxide ($CO_2$) are decreased to a very low level, thus producing a highly pure hydrogen product.

Another object of the present invention is to provide a PSA apparatus composed of a plurality of adsorption columns, in which various adsorbents for hydrogen purification are sequentially charged in respective adsorption columns, and thereby, through hydrogen purification of a PSA process using the same, the resultant hydrogen product contains less than 10 ppm carbon monoxide, and the recovery of hydrogen is increased.

A further object of the present invention is to provide a PSA apparatus and a hydrogen purification method using the same, in which a cuprous chloride (CuCl)-impregnated alumina adsorbent, which has a Henry's law constant at least four times as high as that of a zeolite 5A adsorbent, in a region having low partial pressure of carbon monoxide, is used in the adsorption column, thereby effectively adsorbing and removing a very small amount of carbon monoxide upon hydrogen purification.

Technical Solution

The above objects of the present invention are accomplished by providing a PSA apparatus and a hydrogen purification method using the same, in which the charging and ratio of various adsorbents in a plurality of adsorption columns are appropriately controlled to increase the efficiency of a hydrogen purification process, thus changing the process conditions accordingly, thereby increasing the purity of the purified hydrogen product or the productivity and recovery of hydrogen products.

In order to achieve the objects of the present invention, the present invention provides a PSA apparatus, comprising a plurality of adsorption columns connected with a feed supply pipe for supplying a hydrogen-containing gas mixture as a feed gas, a vacuum pump for maintaining the respective adsorption columns in a vacuum state, a hydrogen storage tank for recovering purified hydrogen from the adsorption columns through a hydrogen product recovery pipe to store it, and a plurality of valves for separately opening or closing pipes for mutually connecting the respective adsorption columns, the adsorption columns and the hydrogen storage tank, and the adsorption columns and the vacuum pump.

At least two adsorption columns may be disposed parallel to each other, and preferably three or four adsorption columns may be disposed parallel to each other, so that the adsorption columns separately adsorb the gas mixture supplied through the feed supply pipe and perform steps of purging, pressure equalization, depressurization, and pressurization, thus realizing hydrogen purification.

In the adsorption columns, activated carbon and zeolite 13X, zeolite 5A, and a cuprous chloride (CuCl)-impregnated alumina adsorbent may be sequentially charged at a predetermined ratio.

When the hydrogen-containing gas mixture is supplied into the adsorption column, the hydrogen-containing gas mixture, including impurities such as carbon dioxide, methane and carbon monoxide, may be purified into a highly pure hydrogen product by passing it through the adsorption column packed with the plurality of adsorbents, and the hydrogen product may be stored in the hydrogen storage tank through the hydrogen product recovery pipe connected with the plurality of valves.

Further, 1~100% of zeolite 5A, which is one of the adsorbents, may be replaced with a carbon monoxide-selective adsorbent.

Further, 1~100% of activated carbon, which is one of the adsorbents, may be replaced with zeolite 13X.

The carbon monoxide-selective adsorbent may be a cuprous chloride (CuCl)-impregnated alumina adsorbent.

Also, under the activated carbon, which is disposed at the lowest position in the adsorption column, active alumina may be charged.

In addition, the present invention provides a hydrogen purification method using the PSA apparatus, comprising supplying a hydrogen-containing gas mixture into one adsorption column among a plurality of adsorption columns through a feed supply pipe, transporting hydrogen purified through the adsorption columns into a hydrogen storage tank through a hydrogen product recovery pipe, conducting primary pressure equalization, by which two adsorption columns other than the adsorption column into which the hydrogen-containing gas mixture is supplied are subjected to countercurrent depressurization to atmospheric pressure or lower so as to realize pressure equalization between the two adsorption columns, supplying the gas discharged from any one adsorption column between the two adsorption columns subjected to primary pressure equalization so that the adsorbents in the other adsorption column are purged, conducting secondary pressure equalization, by which valves are opened to connect the purged adsorption column and the adsorption column discharging the purge gas to each other so as to realize pressure equalization between the two adsorption columns, and separately conducting adsorption and product pressurization for the adsorption columns other than the adsorption columns subjected to secondary pressure equalization.

In the hydrogen purification method using the PSA apparatus, transporting the hydrogen purified through the adsorption columns into the hydrogen storage tank through the hydrogen product recovery pipe may further include circulating hydrogen in the hydrogen storage tank for use in the purging and hydrogen product pressurization of the other adsorption columns.

The hydrogen purification method having such a stepwise hydrogen purification process may be separately conducted in the respective adsorption columns, and, after the completion of one process cycle for hydrogen purification in the respective adsorption columns, the supplied hydrogen-containing gas mixture may be repeatedly subjected to the periodical hydrogen purification process.

The aforementioned hydrogen purification process may be a 4-column hydrogen purification method using four adsorption columns. In the case of a 3-column hydrogen purification method using three adsorption columns, it is possible for partial pressure equalization to be conducted only once.

Advantageous Effects

As mentioned above, according to the present invention, in the PSA apparatus and the hydrogen purification method using the same, adsorptive selectivity to impurities included in a hydrogen-containing gas mixture can be increased, and further, the content of carbon monoxide (CO) and carbon dioxide ($CO_2$) can be decreased to a very low level, thus producing highly pure hydrogen products. Furthermore, some of activated carbon charged in the respective adsorption columns of the PSA apparatus can be replaced with zeolite 13X, thus increasing the efficiency of adsorption of carbon dioxide.

In addition, according to the present invention, a cuprous chloride (CuCl)-impregnated alumina adsorbent is used instead of some of the zeolite 5A, so that the content of carbon monoxide in the purified hydrogen product can be decreased to 10 ppm or less, thus facilitating the production of highly pure hydrogen products.

In addition, according to the present invention, in the countercurrent depressurization step of the hydrogen purification process, the final pressure can be conducted in a vacuum, thereby increasing the recovery of hydrogen and decreasing the size of the PSA apparatus for hydrogen purification.

DESCRIPTION OF THE REFERENCE NUMERALS IN THE DRAWINGS

111~114: adsorption column 120: vacuum pump
130: hydrogen storage tank 141~144: supply valve
151~154: vacuum valve 161~164: recovery valve
171~174: line valve

BEST MODE FOR CARRYING OUT THE INVENTION

The preferred embodiments of the present invention, with regard to the PSA apparatus and the hydrogen purification method using the same, will be more definitely understood with reference to the accompanying drawings.

PSA Apparatus

Figure 1:
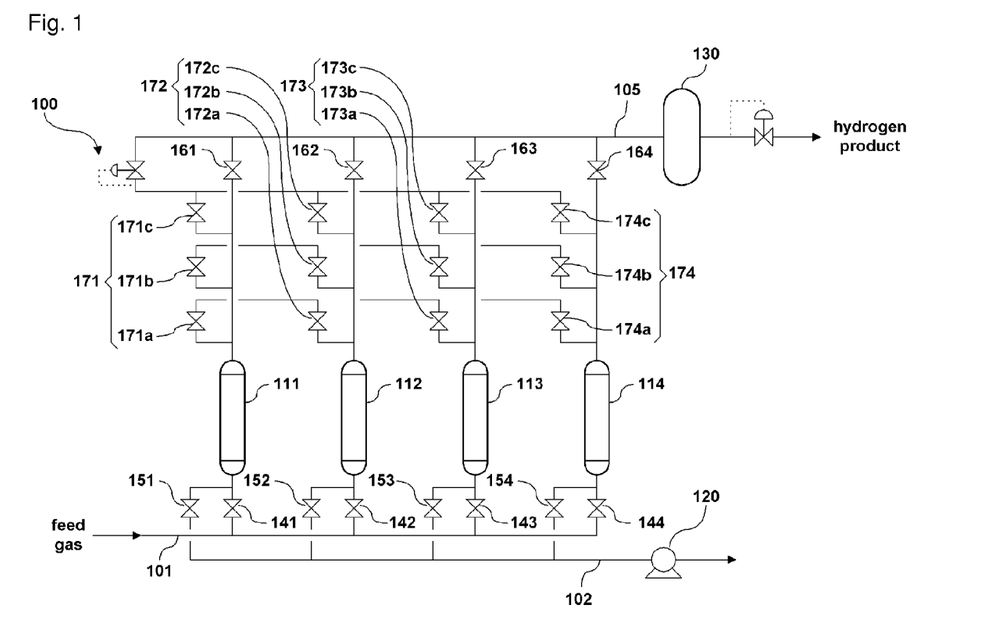
FIG. 1 is a schematic view illustrating the PSA apparatus, according to the present invention.

FIG. 1 illustrates the construction of the PSA apparatus according to the present invention.

As illustrated in FIG. 1, the PSA apparatus 100 of the present invention comprises a plurality of adsorption columns 111~114 connected with a feed supply pipe 101, a vacuum pump 120 connected to the respective adsorption columns 111~114 to separately maintain the adsorption columns 111~114 in a vacuum state, a hydrogen storage tank 130 for storing a hydrogen product recovered from the adsorption columns 111~114, and a plurality of valves 141~144, 151~154, 161~164, 171~174 for opening or closing a plurality of pipes 101~105 for connecting the adsorption columns 111~114, the hydrogen storage tank 130, and the vacuum pump 120.

The adsorption columns 111~114 include first to fourth adsorption columns 111~114, at least two adsorption columns of which are disposed parallel to each other, and the lower ends of the respective adsorption columns 111~114 are connected to the feed supply pipe 101 for supplying a gas mixture containing hydrogen gas through first to fourth supply valves 141~144.

Further, the lower portions of the adsorption columns 111~114 are connected with the vacuum pump 120 through an exhaust gas pipe 102 branched off from the downstream ends of the first to fourth supply valves 141~144 provided on the feed supply pipe 101, and also, a plurality of vacuum valves 151~154 is separately provided on the exhaust gas pipe 102 connected to the adsorption columns 111~114.

The hydrogen product purified through the first to fourth adsorption columns 111~114 is collected into the hydrogen storage tank 130 through the hydrogen product recovery pipe 105 connected via the respective adsorption columns 111~114 and the plurality of valves 141~144, 151~154, 161~164, 171~174. The hydrogen product purified through the respective adsorption columns 111~114 is transported into the hydrogen storage tank 130 by separately opening or closing the recovery valves 161~164 in response to the adsorption process of each of the adsorption columns 111~114.

The first to fourth adsorption columns 111~114 are constructed to enable separate gas transport through first to fourth line valves 171~174 for connecting the respective adsorption columns 111~114. The line valves 171~174 communicate with the adsorption columns 111~114 and the recovery valves 161~164 directly connected to the hydrogen storage tank 130.

The hydrogen product collected into the hydrogen storage tank 130 may be supplied into any one adsorption column 111~114 among the plurality of adsorption columns 111~114 along the recovery valves 161~164 and the line valves 171~174, which are sequentially opened according to the process sequence. The hydrogen gas supplied into the adsorption columns 111~114 from the hydrogen storage tank 130 is used for the purging and hydrogen product pressurization of the corresponding adsorption columns 111~114.

The sequential hydrogen purification process using the PSA apparatus, composed of the aforementioned technical construction, is described in greater detail with reference to the accompanying drawings.

The first to fourth adsorption columns 111~114 are packed with a plurality of adsorbents for purifying only hydrogen from the hydrogen-containing gas mixture.

In the first to fourth adsorption columns 111~114, activated carbon, zeolite 13X, zeolite 5A, and a cuprous chloride (CuCl)-impregnated alumina adsorbent are sequentially charged.

The activated carbon is disposed at the lowest position in the respective adsorption columns 111~114, and is responsible for removing carbon dioxide ($CO_2$) and methane ($CH_4$) among impurities in the hydrogen-containing gas mixture, which is supplied into the adsorption column 111~114 through the feed supply pipe 101.

The zeolite 13X functions mainly to adsorb and remove carbon dioxide ($CO_2$) that is not removed by the activated carbon, among impurities in the hydrogen-containing gas mixture.

The zeolite 5A functions to remove carbon monoxide (CO) among impurities in the hydrogen-containing gas mixture and also to remove methane that is not adsorbed by the activated carbon and zeolite 13X.

The cuprous chloride (CuCl)-impregnated alumina adsorbent functions to adsorb carbon monoxide (CO), which is not sufficiently adsorbed by the zeolite 5A, among impurities in the hydrogen-containing gas mixture.

When the adsorption functions of the adsorbents to the hydrogen-containing gas mixture are exhibited, the adsorbents adsorb little hydrogen in the hydrogen-containing gas mixture, and thus carbon monoxide is present in an amount less than 10 ppm in the hydrogen product purified through the adsorption columns 111~114, thereby enabling the production of a highly pure hydrogen product.

More specifically describing the first to fourth adsorption columns 111~114 and the adsorbents charged therein, the first to fourth adsorption columns 111~114 are designed to have a diameter of 2.5 cm and a length of 120 cm. Therefore, activated carbon, which is disposed at the lowest position in the adsorption columns 111~114, is charged at a height of 30 cm, zeolite 13X is charged at a height of 10 cm on the activated carbon, and zeolite 5A, which is disposed at the highest position in the adsorption columns, is charged at a height of 80 cm on zeolite 13X.

For comparison of the above charging of the adsorbents and the hydrogen purification efficiency, activated carbon and zeolite 13X are charged at the same height in the first to fourth adsorption columns 111~114, having the same diameter and length, zeolite 5A is charged at a height of 55 cm thereon, and a CuCl-impregnated adsorbent, which is disposed at the highest position, is charged at a height of 25 cm thereon.

In this way, the charging ratio of the adsorbents in the first to fourth adsorption columns 111~114 is adjusted, and thus, hydrogen purification efficiencies are measured and compared, and are more specifically described with reference to the examples and comparative examples below.

Hydrogen Purification Method using PSA Apparatus

Figure 2:
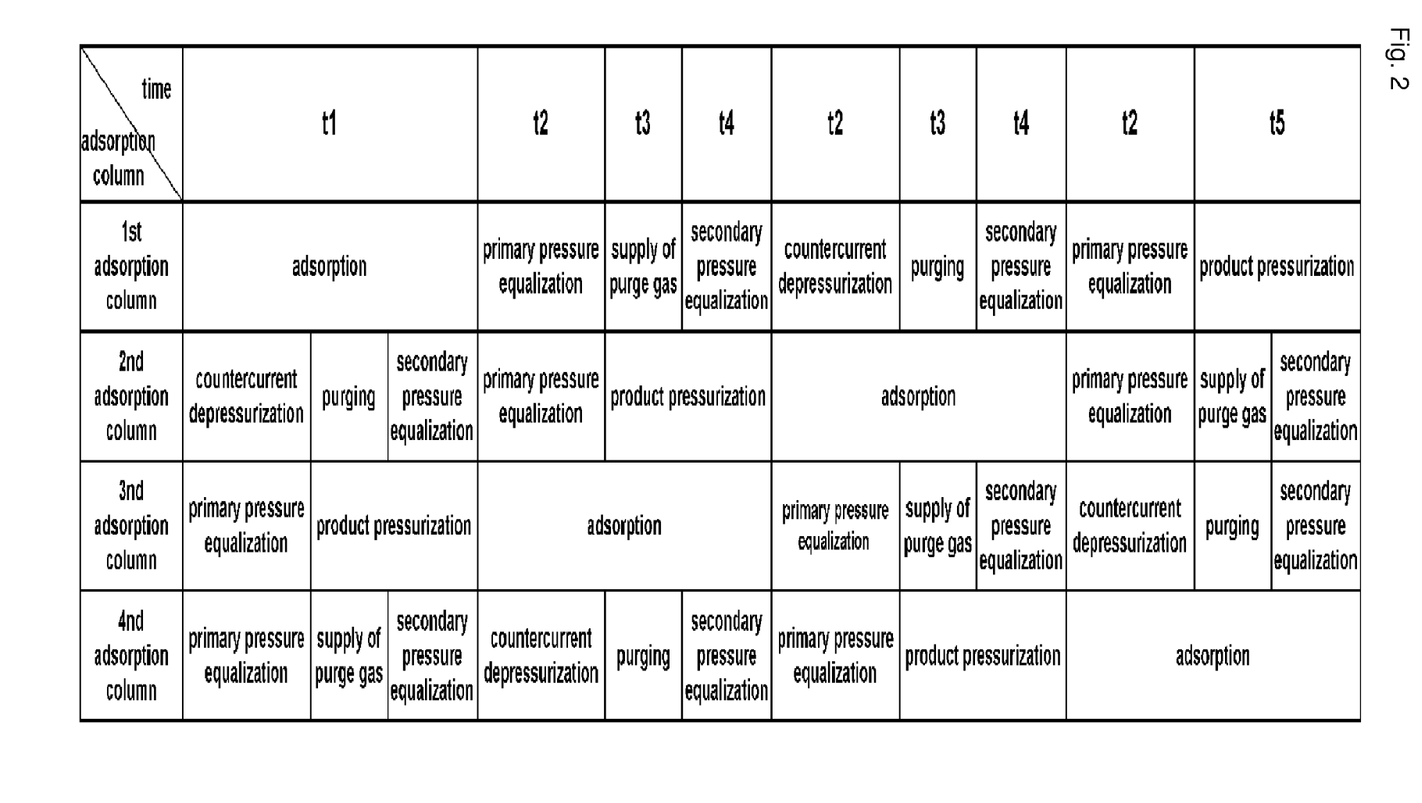
FIG. 2 is a table illustrating one cycle of the hydrogen purification process using a 4-column PSA apparatus, according to the present invention.

FIG. 2 is a table showing one cycle of the hydrogen purification process using the PSA apparatus according to the present invention.

With reference to FIG. 1 showing the PSA apparatus and FIG. 2, the process for purifying hydrogen from the hydrogen-containing gas mixture is as follows.

The hydrogen purification process is described based on the 4-column adsorption process using four adsorption columns as shown in FIG. 1.

First, the hydrogen-containing gas mixture, which is a feed gas, is supplied into the first adsorption column 111 through the feed supply pipe 101. As such, among the supply valves 141~144, only the first supply valve 141, connected to the first adsorption column 111, is opened.

The impurities, such as carbon dioxide, methane, and carbon monoxide, which are included in the hydrogen-containing gas mixture supplied into the first adsorption column 111, are sequentially adsorbed by the adsorbents charged in the first adsorption column 111, thus obtaining hydrogen, and the hydrogen resulting from the first adsorption column 111 is transported into the hydrogen storage tank 130 by opening the first recovery valve 161 on the hydrogen product recovery pipe 105.

After the purification of the hydrogen-containing gas mixture through the first adsorption column 111, the purified hydrogen is transported into the hydrogen storage tank 130, and simultaneously, the second adsorption column 112 is subjected to countercurrent depressurization to atmospheric pressure or lower by opening the second vacuum valve 152 connected to the exhaust gas pipe 102.

Further, the third adsorption column 113 and the fourth adsorption column 114 are subjected to a primary pressure equalization step. The gas discharged from the fourth adsorption column 114 is supplied into the third adsorption column 113 through the second valves 174b, 173b of the fourth line valve 174 and the third line valve 173, and is thus used for the pressurization of the third adsorption column 113.

The step of pressure equalization between the third adsorption column 113 and the fourth adsorption column 114 is conducted until the pressure in the adsorption column 113 is almost the same as that of the adsorption column 114.

Next, after the completion of the step of primary pressure equalization between the fourth adsorption column 114 and the third adsorption column 113, the fourth adsorption column 114 is subjected to a step of supplying a large amount of discharge gas therefrom as the purge gas of the second adsorption column 112, with concurrent depressurization through the first valve 174a of the fourth line valve 174.

The second adsorption column 112 receives the gas from the fourth adsorption column 114 by opening the first valve 172a of the second line valve 172 and the second vacuum valve 152 connected to the exhaust gas pipe 102, so that the adsorbents therein are purged. The purified hydrogen product is introduced into the third adsorption column 113 in a countercurrent direction by closing the second valve 173b of the third line valve 173 and opening the third valve 173c of the same line, whereby the pressure of the third adsorption column 113 reaches adsorption pressure.

When the purging step of the second adsorption column 112 using the discharge gas from the fourth adsorption column 114 is completed, the second vacuum valve 152 connected to the second adsorption column 112 is closed, and the fourth adsorption column 114 and the second adsorption column 112 are connected to each other through the second valve 172b of the second line valve 172 and the second valve 174b of the fourth line valve 174, which are opened, thereby realizing a secondary pressure equalization step.

As such, the first adsorption column 111 and the third adsorption column 113 are continuously subjected to an adsorption step and a pressurization step by product, respectively.

Next, when the adsorption step of the first adsorption column 111 is completed, the first supply valve 141 and the first recovery valve 161, connected to the feed supply pipe 101 and the first adsorption column 111, respectively, are closed, and the second valve 171b of the first line valve 171 and the second valve 172b of the second line valve 172 are opened, so that the pressure of the first adsorption column 111 is equalized with that of the second adsorption column 112.

The third adsorption column 113 is subjected to an adsorption step by closing the third valve 173c of the third line valve 173 and opening the third supply valve 143 connected to the feed supply pipe 101 and the third recovery valve 163 connected to the hydrogen product recovery pipe 105. The fourth adsorption column 114 is subjected to a countercurrent depressurization step by closing the second valve 174b of the fourth line valve 174 and opening the fourth vacuum valve 154.

After the completion of the pressure equalization between the first adsorption column 111 and the second adsorption column 112, the first adsorption column 111 is subjected to a step of supplying the discharge gas therefrom as the purge gas of the fourth adsorption column 114, with concurrent depressurization through the first valve 171a of the first line valve 171. The fourth adsorption column 114 receives the gas from the first adsorption column 111 by opening the first valve 174a of the fourth line valve 174 and the fourth vacuum valve 154, thus purging the adsorbents therein.

Subsequently, the purified hydrogen product is introduced into the second adsorption column 112 in a countercurrent direction by closing the second valve 172b of the second line valve 172 and opening the third valve 172c of the second line valve 172, so that the second adsorption column 112 is pressurized to adsorption pressure.

When the purging step of the fourth adsorption column 114 using the discharge gas from the first adsorption column 111 is completed, the fourth vacuum valve 154 is closed, and the fourth adsorption column 114 and the first adsorption column 111 are connected to each other through the second valve 171b of the first line valve 171 and the second valve 174b of the fourth line valve 174, thereby realizing a secondary pressure equalization step. As such, the third adsorption column 113 and the second adsorption column 112 are continuously subjected to an adsorption step and a product depressurization step, respectively.

Next, when the adsorption step of the third adsorption column 113 is completed, the third supply valve 143 connected to the feed supply pipe 101 and the third recovery valve 163 are closed, and the second valve 173b of the third line valve 173 and the second valve 174b of the fourth line valve 174 are opened, thus equalizing the pressure of the third adsorption column 113 with that of the fourth adsorption column 114.

Thereafter, the second adsorption column 112 is subjected to an adsorption step by closing the third valve 172c of the second line valve 172 and opening the second supply valve 142 connected to the feed supply pipe 101 and the second recovery valve 162 connected to the second adsorption column 112.

The first adsorption column 111 is subjected to a countercurrent depressurization step by closing the second valve 171b of the first line valve 171 and opening the first vacuum valve 151 connected to the exhaust gas pipe 102.

After the completion of the pressure equalization between the third adsorption column 113 and the fourth adsorption column 114, the third adsorption column 113 is subjected to a step of supplying the discharge gas therefrom as the purge gas of the first adsorption column 111, with concurrent depressurization through the first valve 173a of the third line valve 173. The first adsorption column 111 receives the gas from the third adsorption column 113 by opening the first valve 171a of the first line valve 171 and the first vacuum valve 151 connected to the exhaust gas pipe 102, thus purging the adsorbents in the first adsorption column 111.

The purified hydrogen product is introduced into the fourth adsorption column 114 in a countercurrent direction by closing the fourth vacuum valve 154 connected to the exhaust gas pipe 102 and opening the third valve 174c of the fourth line valve 174, so that the fourth adsorption column 114 is pressurized to adsorption pressure.

When the purging step of the first adsorption column 171 using the discharge gas from the third adsorption column 173 is completed, the first vacuum valve 151 is closed, and the first adsorption column 111 and the third adsorption column 113 are connected to each other through the second valve 171b of the first line valve 171 and the second valve 173b of the third line valve 173, thus realizing a secondary pressure equalization step. As such, the second adsorption column 112 and the fourth adsorption column 114 are continuously subjected to an adsorption step and a product depressurization step, respectively.

Finally, when the adsorption step in the second adsorption column 112 is completed, the second supply valve 142 connected to the feed supply pipe 101 and the second recovery valve 162 connected to the second adsorption column 112 are closed, and the second valve 171b of the first line valve 171 and the second valve 172b of the second line valve 172 are opened, thus equalizing pressure of the first adsorption column 111 with that of the second adsorption column 112.

The fourth adsorption column 114 is subjected to an adsorption step by closing the third valve 174c of the fourth line valve 174 and opening the fourth supply valve 144 connected to the feed supply pipe 101 and the fourth recovery valve 164 connected to the fourth adsorption column 114.

The third adsorption column 113 is subjected to a countercurrent depressurization step by closing the second valve 173b of the third line valve 173 and opening the third vacuum valve 153 connected to the exhaust gas pipe 102.

After the completion of the pressure equalization between the first adsorption column 111 and the second adsorption column 112, the second adsorption column 112 is subjected to a step of supplying the discharge gas therefrom as the purge gas of the third adsorption column 113, with concurrent depressurization through the first valve 172a of the second line valve 172.

The third adsorption column 113 receives the gas from the second adsorption column 112 by opening the first valve 173a of the third line valve 173 and the third vacuum valve 153 connected to the exhaust gas pipe 102, thus purging the adsorbents in the third adsorption column 113. The purified hydrogen product is introduced into the first adsorption column 111 in a countercurrent direction by closing the second valve 171b of the first line valve 171 and opening the third valve 171c of the first line valve 171, so that the first adsorption column 111 is pressurized to adsorption pressure.

When the purging step of the third adsorption column 113 using the discharge gas from the second adsorption column 112 is completed, the third vacuum valve 153 connected to the exhaust gas pipe 102 is closed, and the second adsorption column 112 and the third adsorption column 113 are connected to each other through the second valve 172b of the second line valve 172 and the second valve 173b of the third line valve 173, thus realizing a secondary pressure equalization step. In this case, the fourth adsorption column 114 and the first adsorption column 111 are continuously subjected to an adsorption step and a product depressurization step, respectively.

In the hydrogen purification method using the PSA apparatus of the present invention through the stepwise hydrogen purification process, the hydrogen purification process is conducted in the respective adsorption columns 111~114. After the completion of one process cycle for hydrogen purification in the respective adsorption columns 111~114, the hydrogen-containing gas mixture supplied from the feed supply pipe 101 is repeatedly subjected to the periodical hydrogen purification process.

The above hydrogen purification process is the 4-column hydrogen purification method using four adsorption columns 111~114. In the case of a 3-column hydrogen purification method using three adsorption columns, partial pressure equalization is conducted only once.

Figure 4:
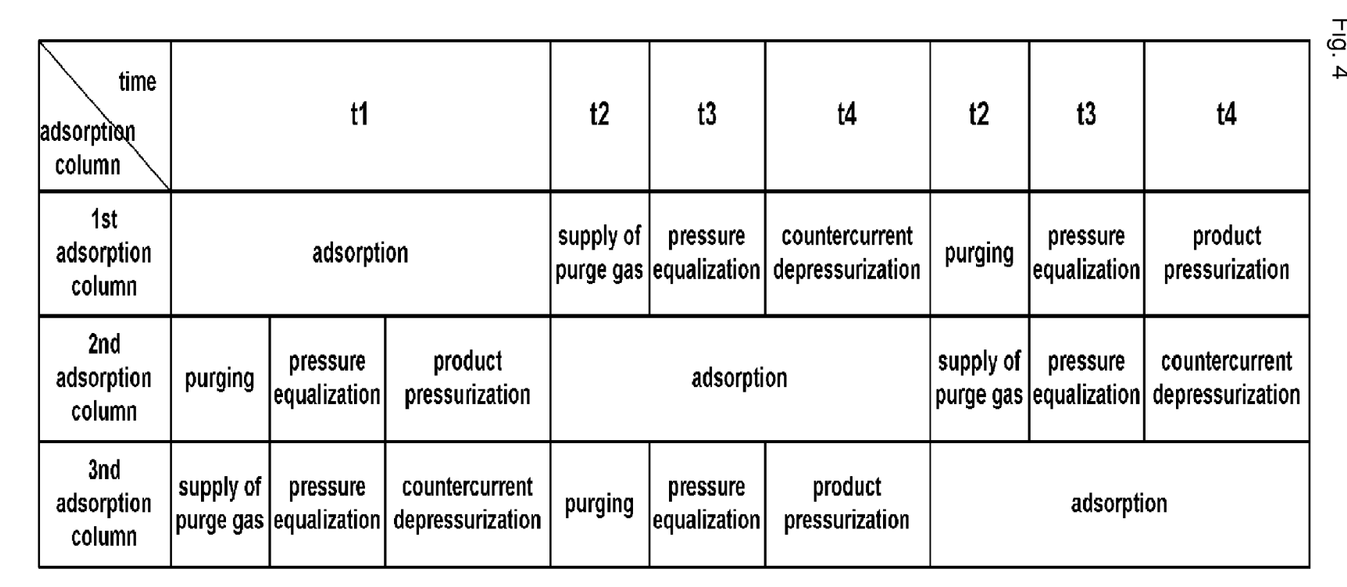
FIG. 4 is a table illustrating one cycle of the hydrogen purification process using a 3-column PSA apparatus, according to the present invention.

FIG. 4 is a table showing one cycle of the hydrogen purification process using a 3-column PSA apparatus including three columns.

In the PSA apparatus according to the present invention, the adsorbents may be charged at an adjustable ratio in different forms in the respective adsorption columns, and thus, examples and comparative examples are described below using the 4-column PSA apparatus or 3-column PSA apparatus in which various adsorbents are charged at different ratios.

The operation conditions of the 4-column PSA apparatus for purifying hydrogen from the hydrogen-containing gas mixture, including impurities such as carbon dioxide, methane, and carbon monoxide, are as follows.

In the following examples, in the adsorption columns in which a plurality of adsorbents is sequentially disposed, the charging of active alumina or silica gel for removing water is fundamental, and thus a description thereof is omitted.

EXAMPLE 1

Feed (hydrogen-containing gas mixture) flow rate: 10 SLM
Feed composition: 73.5 vol % hydrogen, 4.5 vol % carbon monoxide, 3.8 vol % methane, 18.2 vol % carbon dioxide
Feed temperature: room temperature (21° C.)
Hydrogen product pressurization flow rate: 3 SLM
Process cycle: 480 sec
Final pressure of adsorption columns in steps: adsorption (120 sec)/11.5 atm, primary pressure equalization (10 sec)/6.5 atm, supply of a purge gas (100 sec)/4.5 atm, secondary pressure equalization (10 sec)/2.5 atm, countercurrent depressurization (10 sec)/1.0 atm, purging (100 sec)/380 mmHg, secondary pressure equalization (10 sec)/2.5 atm, primary pressure equalization (10 sec)/6.5 atm, product pressurization (110 sec)/11.5 atm

COMPARATIVE EXAMPLE 1 OF EXAMPLE 1

The process was conducted using a 4-column PSA apparatus in which an activated carbon bed, a zeolite 13X bed, and a zeolite 5A bed were charged at a height ratio of 3:1:8 in the plurality of adsorption columns, under the above process conditions. When the recovery of hydrogen was 90%, the contents of methane ($CH_4$) and carbon monoxide (CO) in the hydrogen product were 80 ppmv and 10 ppmv, respectively. No carbon dioxide ($CO_2$) component was detected in the purified hydrogen product.

COMPARATIVE EXAMPLE 2 OF EXAMPLE 1

The charging ratio of the activated carbon bed and the zeolite 13X bed in the plurality of adsorption columns was set at 3:1, as in the above case, and some of the zeolite 5A bed was replaced with a cuprous chloride (CuCl)-impregnated alumina adsorbent so that the charging ratio thereof was set at 5.5:2.5.

According to the process using the 4-column PSA apparatus under the process conditions of Example 1, when the recovery of hydrogen was 90%, the contents of methane ($CH_4$) and carbon monoxide (CO) in the hydrogen product were less than 70 ppmv and 0.5 ppmv, respectively. When the recovery of hydrogen was 93%, the contents of methane ($CH_4$) and carbon monoxide (CO) in the hydrogen product were less than 210 ppmv and 1 ppmv, respectively.

Figure 3:
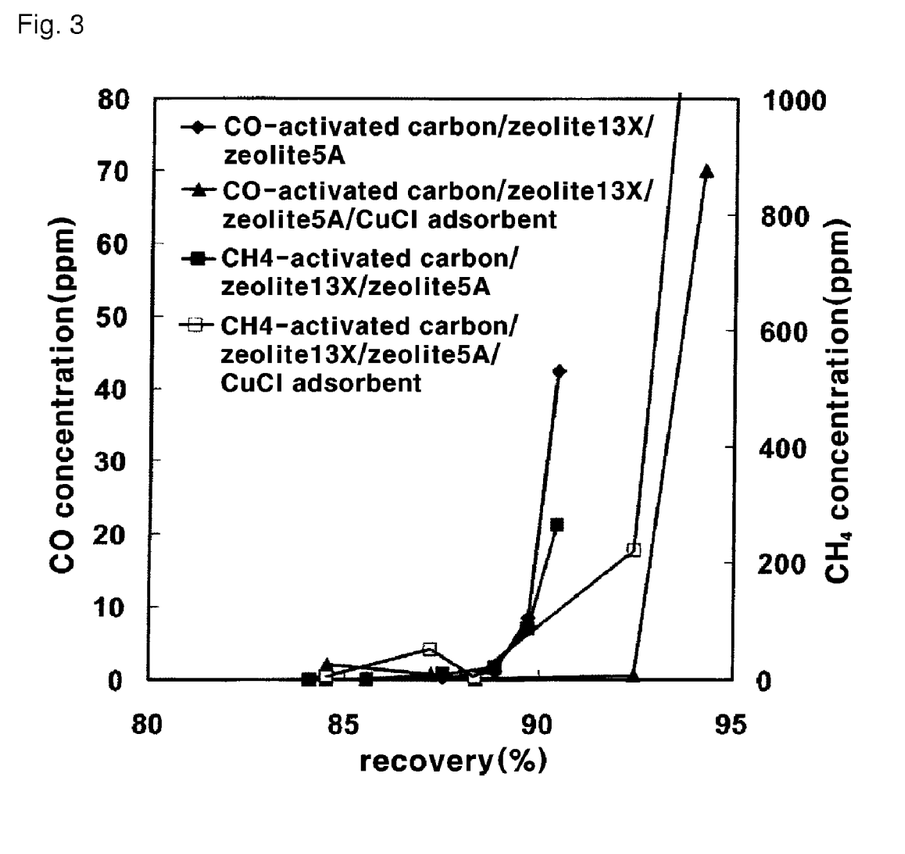
FIG. 3 is a graph illustrating the recovery of hydrogen versus the content of impurities in a hydrogen product, upon hydrogen purification using the 4-column PSA apparatus, according to the present invention.

Consequently, through replacement of some of the zeolite 5A with the cuprous chloride-impregnated alumina adsorbent, the content of methane in the hydrogen product was slightly increased, but the content of carbon monoxide (CO) could be decreased to 1 ppmv or less (FIG. 3).

In addition, the operation conditions of the 3-column PSA apparatus for purifying hydrogen from the hydrogen-containing gas mixture including impurities such as carbon dioxide, methane, and carbon monoxide are as follows.

EXAMPLE 2

Feed (hydrogen-containing gas mixture) flow rate: 10 SLM
Feed composition: 73.5 vol % hydrogen, 4.5 vol % carbon monoxide, 3.8 vol % methane, 18.2 vol % carbon dioxide
Feed temperature: room temperature (20° C.)
Hydrogen product pressurization flow rate: 6 SLM
Process cycle: 300 sec
Final pressure of adsorption columns in steps: adsorption (100 sec)/11.5 atm, supply of purge gas (45 sec)/8.0 atm, primary pressure equalization (15 sec)/4.0 atm, counter-current depressurization (40 sec)/300 mmHg, purging (45 sec)/300 mmHg, primary pressure equalization (15 sec)/4.0 atm, product pressurization (40 sec)/9.5 atm

COMPARATIVE EXAMPLE 1 OF EXAMPLE 2

The process was conducted using a 3-column PSA apparatus in which an activated carbon bed, a zeolite 13X bed, and a zeolite 5A bed were charged at a height ratio of 3:1:8 in the plurality of adsorption columns under the above process conditions. When the recovery of hydrogen was 85%, the contents of methane ($CH_4$) and carbon monoxide (CO) in the hydrogen product were 120 ppmv and 10 ppmv, respectively. No carbon dioxide ($CO_2$) was detected in the purified hydrogen product.

COMPARATIVE EXAMPLE 2 OF EXAMPLE 2

The ratio of the activated carbon bed and the zeolite 13X bed in the plurality of adsorption columns was set at 3:1 as in the above case, and some of the zeolite 5A bed was replaced with a cuprous chloride (CuCl)-impregnated alumina adsorbent so that the charging ratio thereof was set at 5.5:2.5.

According to the process using the 3-column PSA apparatus under the process conditions of Example 2, when the recovery of hydrogen was 85%, the contents of methane ($CH_4$) and carbon monoxide (CO) in the hydrogen product were less than 140 ppmv and 1 ppmv, respectively. When the recovery of hydrogen was 91%, the contents of methane ($CH_4$) and carbon monoxide (CO) in the hydrogen product were less than 650 ppmv and 7 ppmv, respectively.

Figure 5:
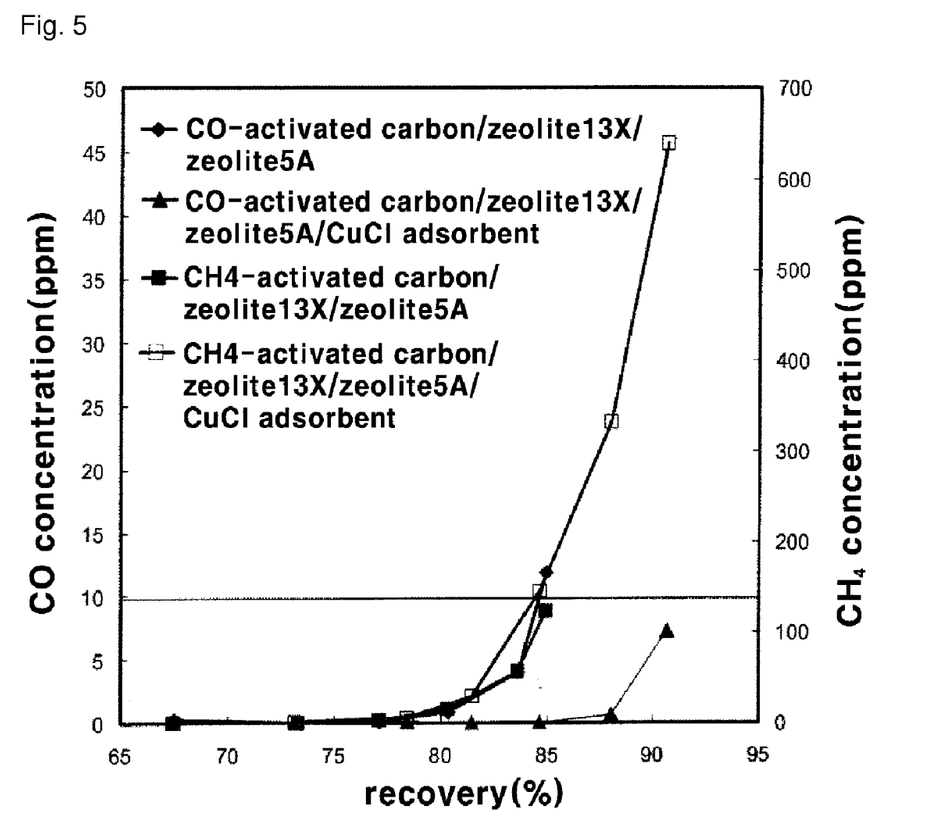
FIG. 5 is a graph illustrating the recovery of hydrogen versus the content of impurities in a hydrogen product upon hydrogen purification using the 3-column PSA apparatus, according to the present invention.

Consequently, through replacement of some of the zeolite 5A with the cuprous chloride-impregnated alumina adsorbent, the content of methane in the hydrogen product was slightly increased, but the content of carbon monoxide (CO) could be decreased to 1 ppmv or less (FIG. 5).

As is apparent from the results of process simulation using the 3-column PSA apparatus, under conditions of adsorption pressure of 10 atm, desorption pressure of 0.3 atm, and final pressure for supply of a purge gas of 3 atm while supplying the hydrogen-containing gas mixture at 10 SLM, when the activated carbon bed, the zeolite 13X bed, and the zeolite 5A bed in the adsorption column were charged at a height ratio of 5:1:6, the best results were obtained from the aspect of the purity of hydrogen.

Depending on the height ratio of the adsorbents, the purity of the hydrogen product was increased according to the following:

3.5:0.5:8>3:1:8>2:2:8

From the aspect of the content of carbon monoxide in the purified hydrogen product, as the charging amount of zeolite 5A increased, more effective results were obtained. That is, even if activated carbon and zeolite 13X were charged at a different ratio, when zeolite 5A was charged in the same amount, the removal of carbon monoxide was almost the same.

In the case where the height ratio of the activated carbon bed, the zeolite 13X bed, and the zeolite 5A bed to be charged in each adsorption column was 5:1:6, carbon dioxide ($CO_2$) was completely adsorbed by the activated carbon bed and the zeolite 13X bed, and did not contact the zeolite 5A bed.

This is because, in the case where the charged amount of zeolite 5A is uniform in each adsorption column, the probability of the inflow of carbon dioxide ($CO_2$) into the zeolite 5A bed is decreased in proportion to the increase in the amount of zeolite 13X.

Hence, in order to eliminate the probability of bringing carbon dioxide ($CO_2$) into contact with the zeolite 5A bed and to minimize the content of carbon monoxide (CO) in the purified hydrogen product, the activated carbon bed, the zeolite 13X bed, and the zeolite 5A bed can be charged at an optimal height ratio of 3:1:8.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pressure swing adsorption apparatus, comprising a plurality of adsorption columns connected with a feed supply pipe, a hydrogen storage tank for collecting purified hydrogen from the adsorption columns, and valves for opening or closing a plurality of pipes respectively connected to the adsorption columns, wherein the adsorption columns are packed with adsorbent beds of active alumina or silica gel, activated carbon, zeolite 13X, zeolite 5A, and a carbon monoxide-selective adsorbent other than the zeolite 5A, in order to remove water, carbon dioxide, methane, and carbon monoxide from a hydrogen-containing gas mixture supplied through the feed supply pipe, and a content of carbon monoxide in hydrogen that is discharged is minimized through sequential adsorption on the adsorbents in the adsorption columns.

2. The apparatus according to claim 1, wherein the adsorption columns are constructed such that at least two adsorption columns are disposed parallel to each other to continuously produce a highly pure hydrogen product.

3. The apparatus according to claim 1, wherein the adsorbents in the adsorption columns comprise active alumina or silica gel, activated carbon, zeolite 13X, zeolite 5A, and a carbon monoxide-selective adsorbent other than the zeolite 5A, which are sequentially disposed upward.

4. The apparatus according to claim 1, wherein the adsorbents in the adsorption columns comprise active alumina or silica gel, activated carbon, zeolite 13X, zeolite 5A, and a carbon monoxide-selective adsorbent other than the zeolite 5A, which are sequentially disposed upward.

5. The apparatus according to claim 3, wherein a portion of the zeolite 5A, which is one of the adsorbents, is replaced with the carbon monoxide-selective adsorbent other than the zeolite 5A.

6. The apparatus according to claim 3, wherein 1-100% of the activated carbon, which is one of the adsorbents, is replaced with zeolite 13X.

7. The apparatus according to claim 3, wherein the carbon monoxide-selective adsorbent other than the zeolite 5A is a cuprous chloride (CuCl)-impregnated alumina adsorbent.

8. The apparatus according to claim 7, wherein the cuprous chloride-impregnated alumina adsorbent has a Henry's law constant for carbon monoxide, related to adsorption equilibrium at room temperature, at least four times as high as that of the zeolite 5A.

9. A pressure swing adsorption apparatus for obtaining a highly pure hydrogen product through continuous purification using adsorption columns in which active alumina or silica gel, activated carbon, zeolite 13X, zeolite 5A, and a cuprous chloride-impregnated alumina adsorbent are sequentially disposed in order to adsorb impurities from a hydrogen-containing gas mixture.

10. A method of purifying hydrogen using a pressure swing adsorption apparatus, comprising:
supplying a hydrogen-containing gas mixture including impurities into an adsorption column packed with a plurality of adsorbents through a feed supply pipe;
adsorbing water on active alumina or silica gel, which is disposed at a lowest position in the adsorption column;
adsorbing carbon dioxide and a methane component on activated carbon, which is disposed on the active alumina or the silica gel in the adsorption column;
adsorbing carbon dioxide, which is not adsorbed by the activated carbon, on zeolite 13X, which is disposed on the activated carbon in the adsorption column;
adsorbing carbon monoxide on zeolite 5A, which is disposed on the zeolite 13X in the adsorption column, and adsorbing the methane component, which is not adsorbed by the activated carbon, thereon;
adsorbing carbon monoxide, which is not adsorbed by the zeolite 5A, on a carbon monoxide-selective adsorbent other than the zeolite 5A, which is disposed on the zeolite 5A in the adsorption column; and
collecting a hydrogen product, which is purified to high purity via the plurality of adsorbents in the adsorption column, into a hydrogen storage tank.

11. The method according to claim 10, wherein a portion of the zeolite 5A, which is one of the adsorbents, is replaced with the carbon monoxide-selective adsorbent other than the zeolite 5A.

12. The method according to claim 10, wherein a portion of the activated carbon, which is one of the adsorbents, is replaced with zeolite 13X.

13. The method according to claim 10, wherein the carbon monoxide-selective adsorbent other than zeolite 5A is a cuprous chloride (CuCl)-impregnated alumina adsorbent.

14. A method of purifying hydrogen using a pressure swing adsorption apparatus composed of two or more adsorption columns in which a plurality of adsorbents is sequentially disposed and which are disposed parallel to each other, the method comprising sequentially passing a hydrogen-containing gas mixture including impurities of water, carbon dioxide, methane, and carbon monoxide through active alumina or silica gel, activated carbon, zeolite 13X, zeolite 5A, and a carbon monoxide-selective adsorbent other than the zeolite 5A, which are disposed in the adsorption columns, so that the hydrogen-containing gas mixture is purified to highly pure hydrogen containing less than 10 ppm carbon monoxide.

15. The method according to claim 14, wherein adsorption, supply of a purge gas, partial pressure equalization (for supplying a gas), countercurrent depressurization, purging, partial pressure equalization (for receiving a gas), and product pressurization are sequentially conducted through the adsorption columns, in which the countercurrent depressurization is conducted by subjecting two or more adsorption columns to countercurrent depressurization to atmospheric pressure or less.

16. The apparatus according to claim 4, wherein a portion of the zeolite 5A, which is one of the adsorbents, is replaced with the carbon monoxide-selective adsorbent other than the zeolite 5A.

17. The apparatus according to claim 4, wherein a portion of the activated carbon, which is one of the adsorbents, is replaced with zeolite 13X.

18. The apparatus according to claim 4, wherein the carbon monoxide-selective adsorbent other than the zeolite 5A is a cuprous chloride (CuCl)-impregnated alumina adsorbent.

19. The apparatus according to claim 18, wherein the cuprous chloride-impregnated alumina adsorbent has a Henry's law constant for carbon monoxide, related to adsorption equilibrium at room temperature, at least four times as high as that of the zeolite 5A.

* * * * *